(12) United States Patent
Whitty

(10) Patent No.: US 6,755,218 B2
(45) Date of Patent: Jun. 29, 2004

(54) DUCT WRAP SECURING SYSTEM

(75) Inventor: Larry Whitty, Woodbridge (CA)

(73) Assignee: Royal Group Technologies Limited, Woodbridge (CA)

( * ) Notice: Subject to any disclaimer, the term of this patent is extended or adjusted under 35 U.S.C. 154(b) by 0 days.

(21) Appl. No.: 10/265,235

(22) Filed: Oct. 7, 2002

(65) Prior Publication Data

US 2004/0016470 A1 Jan. 29, 2004

(51) Int. Cl.$^7$ .................................................. F16L 9/14
(52) U.S. Cl. ............................ 138/149; 138/147; 285/47; 432/234
(58) Field of Search ................................ 138/149, 148, 138/141, 129, 130, 154, 147; 52/506.05; 285/47; 432/234, 233

(56) References Cited

U.S. PATENT DOCUMENTS

| | | | | |
|---|---|---|---|---|
| 307,899 A | * | 11/1884 | Barber ......................... 138/147 |
| 340,691 A | * | 4/1886 | Aldrich ........................ 138/113 |
| 2,282,293 A | * | 5/1942 | Christenson .................. 52/347 |
| 3,147,832 A | * | 9/1964 | Saro ........................... 52/506.05 |
| 3,579,802 A | * | 5/1971 | Gajovski ..................... 29/432.2 |
| 3,946,763 A | * | 3/1976 | Wilce .......................... 138/147 |
| 4,170,451 A | * | 10/1979 | Luff ............................ 432/234 |
| 4,300,323 A | * | 11/1981 | Meechan et al. ............. 52/464 |
| 4,428,730 A | * | 1/1984 | Holmes et al. ................ 432/3 |
| 4,921,018 A | * | 5/1990 | Dridi et al. .................. 138/149 |
| 5,181,319 A | * | 1/1993 | Campbell, Jr. ......... 29/890.053 |
| 5,261,555 A | * | 11/1993 | Rogers et al. .......... 220/592.22 |
| 5,437,312 A | * | 8/1995 | Gumangan et al. .......... 138/149 |
| 5,722,462 A | * | 3/1998 | Dridi et al. ................. 138/149 |
| 6,102,694 A | * | 8/2000 | Lenz ........................... 432/234 |

* cited by examiner

Primary Examiner—Patrick Brinson

(57) ABSTRACT

A duct to receive duct wrap is provided with a plurality of posts at different locations on and upstanding from the post to protrude through the duct wrap. Wrap retainers fit onto the post over the duct wrap securing the duct wrap on the duct.

1 Claim, 3 Drawing Sheets

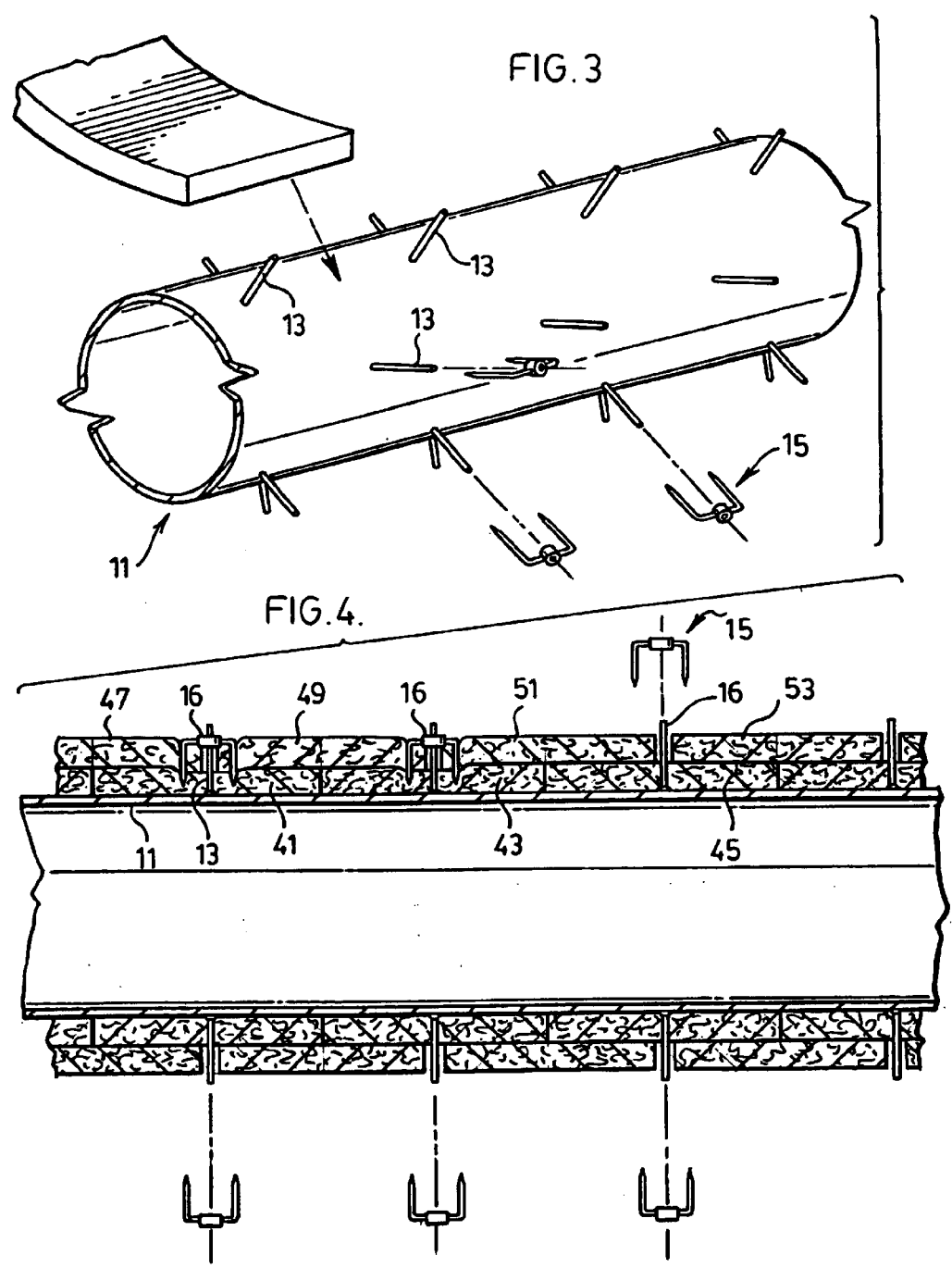

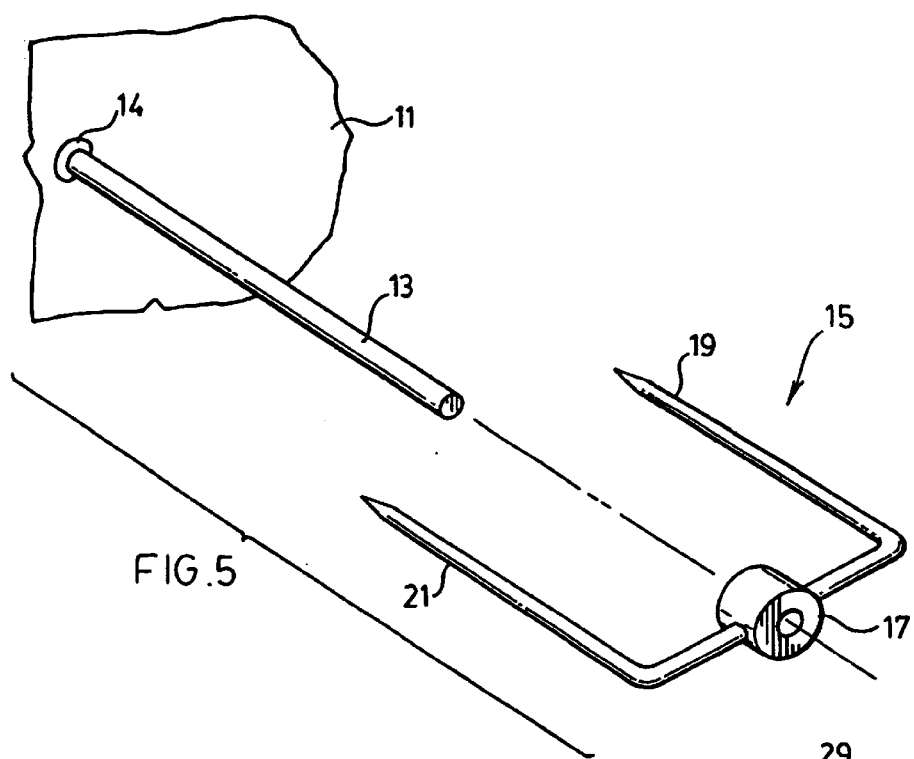
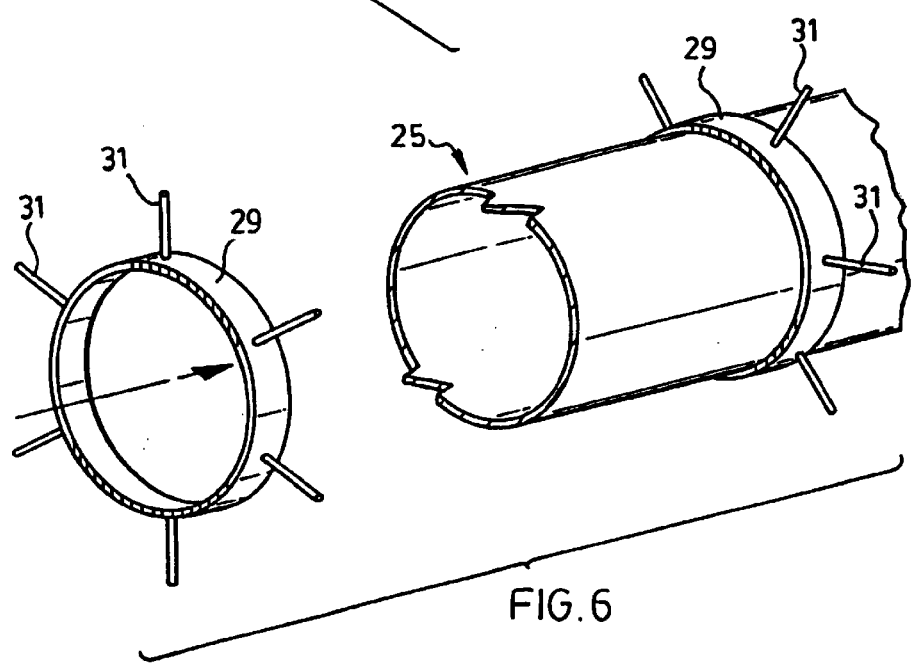

DUCT WRAP SECURING SYSTEM

FIELD OF THE INVENTION

The present invention relates to a system for positively securing duct wrap on a duct.

BACKGROUND OF THE INVENTION

Ducting such as air and grease ducts used to carry extremely hot fluids must be wrapped with insulating duct wrap where they are in close proximity to a flammable building surface. They should also be wrapped at any location that could cause burning on an individual working near the duct.

In the past, a duct covering material has been wrapped in multiple layers around a hot fluid carrying duct. Each successive layer must be positioned to partially overlap the layer below it to ensure that wrap there are no gaps through the wrapping and to help prevent the wrap from releasing from the duct. This results in numerous wrap layers which can become quite heavy and bulky. The weight of the wrap can be problematic particularly where the wrap is provided on a vertically extending duct. In this particular situation the wrapping material has a tendency to slide under its own weight downwardly along the duct away from the desired insulating position on the duct.

SUMMARY OF THE PRESENT INVENTION

The present invention relates to a duct and a duct wrap securing system which avoids the problems associated with prior art duct wraps.

More particularly, according to the present invention, a duct is provided with duct wrap receiving means to positively secure wrap on the duct. The receiving means is in the form of a plurality of posts at different locations on and upstanding from the duct. These posts penetrate through and have protruding portions extending beyond the duct wrap. Duct wrap retainers are then fitted on to the protruding portions of the posts to positively secure the wrap on the duct.

BRIEF DESCRIPTION OF THE DRAWINGS

The above as well as other advantages and features of the present invention will be described in greater detail according to the preferred embodiments of the present invention in which;

FIG. 3 is a perspective of a hot fluid carrying duct according to a preferred embodiment of the present invention;

FIG. 4 is a sectional view through the duct of FIG. 1 and fitted with the duct wrap;

FIG. 5 is an enlarged perspective view showing one of the duct posts and duct retainers from the duct of FIG. 3; and FIG. 6 shows a duct fitted with a post carrying collar according to a further preferred embodiment of the present invention.

DETAILED DESCRIPTION ACCORDING TO THE PREFERRED EMBODIMENTS OF THE PRESENT INVENTION IN WHICH

Figure 1:
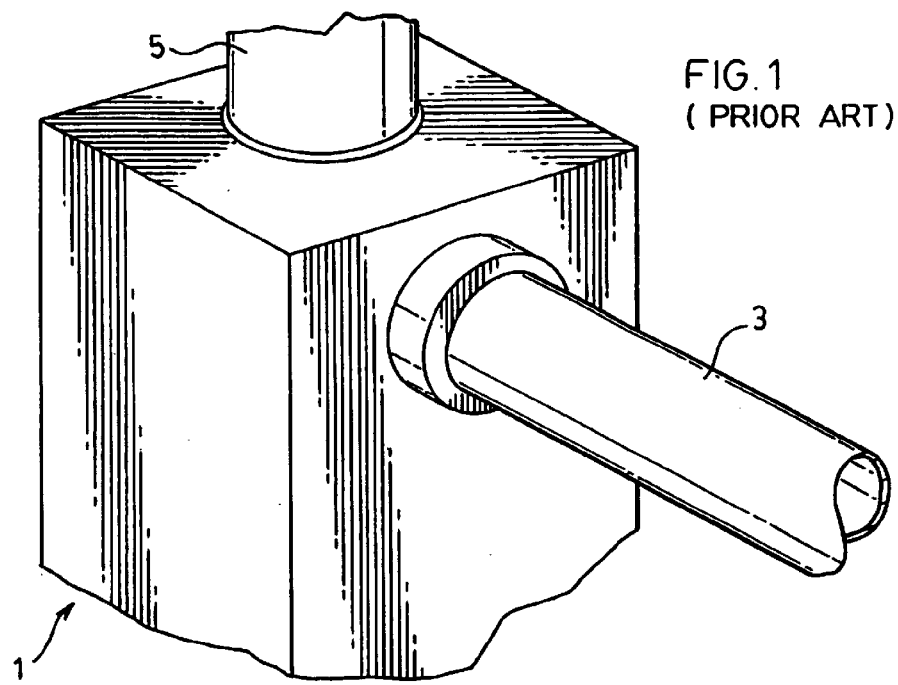
FIG. 1 shows a combustion device having hot fluid carrying ducts extending therefrom and to be fitted with duct wrap.
Figure 2:
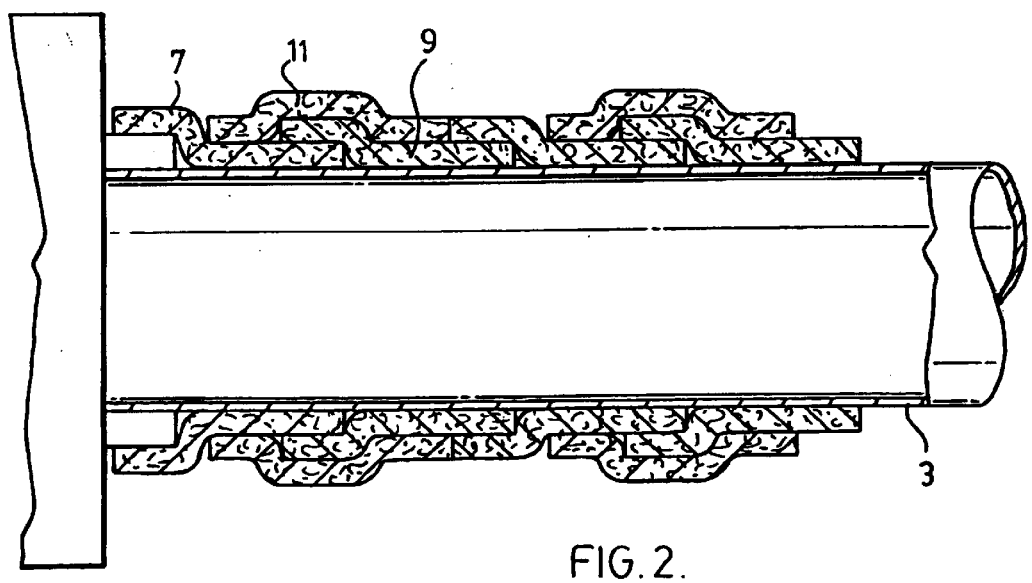
FIG. 2 is a sectional view through one of the ducts from the combustion device of FIG. 1 when fitted with duct wrap according to a prior art wrapping method.

FIGS. 1 and 2 both show products which are currently in the marketplace and which are labeled as PRIOR ART. More particularly, FIG. 1 shows a combustion device 1 having hot fluid carrying ducts 3 and 5. These ducts must be wrapped with insulating material at locations where the ducts are in close proximity to any type of a potentially flammable surface. For example, they must be wrapped with insulating material where the ducts are adjacent to or pass through a wooden separation member e.g., a wall or floor in a building.

These ducts are also typically wrapped with insulation material at the point where they immediately exit the combustion device so as to be safe for anyone working in the vicinity of the combustion device.

Duct 3 could for example be a hot air, hot grease or other hot liquid carrying type duct.

FIG. 2 shows duct 3 wrapped according to a known duct wrapping technique. This technique uses a first wrap 7 of insulating material directly on the surface of the duct. A second wrap 9 of insulating material is positioned such that some of this wrap also sits directly on the duct surface with part of the second wrap 9 overlapping the first wrap 7. It is generally difficult to positively secure the overlap between the wraps 7 and 9 and as such a third wrap 11 is added exteriorly of the two wraps 7 and 9 in an attempt to positively secure all of the wraps with one another.

As can be seen from FIG. 2 the multiple layers of wrap on the duct becomes quite bulky. They are also heavy and if the duct is set in a vertical orientation the weight of the duct wrapping material itself, particularly under the heat which tends to soften and loosen the wrap, will often cause the entire wrapping job to slide downwardly along the duct away from its useful position.

FIG. 3 shows a duct 11 which is again a hot fluid carry duct. The duct of FIG. 3 is made in accordance. with an embodiment of the invention and is specifically adapted to receive duct wrap.

More particularly, duct 11 is provided with a plurality of posts 13 fixed to the exterior surface of and protruding outwardly from duct 11.

Upon wrapping of duct 11 with duct wrap material shown in FIG. 4 each of the posts 11 receives a duct wrap retainer generally indicated at 15. The combination of posts and the duct wrap retainers provides a very positive securing system for the duct wrap even when the duct runs in a vertical orientation.

FIG. 4 shows a specific method of wrapping duct 11 with duct wrap material using the posts and retainers of FIG. 3.

Before discussing the actual wrapping technique of FIG. 4 reference is had to FIG. 5 of the drawings which shows post 13 having its base 14 secured directly to the exterior surface of duct 11. Preferably the attachment of the post to the duct is done through spot-welding or some similar attachment method.

In addition FIG. 5 shows clearly that each wrap retainer 15 is in the form of a pin member having a center eyelet 17 which fits over the free end of post 13. Provided to either side of eyelet 17 are a pair of projecting prongs or pins 19 and 21. These prongs are positioned such that they face back inwardly at the duct when the wrap retainer is positioned on the post.

Reference is now had to FIG. 4 of the drawings which shows a preferred method of positioning duct wrap on duct 11. Here it will be seen that a plurality of individual wraps 41, 43 and 45 are positioned directly against the outside surface of the duct. These individual wraps 41, 43 and 45 abut one another at their edges and do not overlap as found in the prior art.

The individual wraps 41, 43 and 45 are pushed onto the surface of the duct such that the posts 13 penetrate directly through these individual wraps.

A further series of individual wraps 47, 49, 51 and 53 are placed over the interior wraps 41, 43 and 46. The exterior wraps 47, 49, 51 and 53 once again edge abut one another and do not overlap. They are however positioned so as to completely cover the meeting edges of the interior wraps. Therefore there is no area of heat penetration allowed through the very small gaps between the edges of the interior wraps.

The wraps 47, 49, 51 and 53 are positioned such that their adjacent edges meet with one another from opposite sides of the posts 13. A portion of each post indicated at 16 protrudes outwardly beyond the exterior wraps. The eyelet 17 of the retainer 15 fits over the protruding post portion 16 with the two prongs 19 and 21 of each retainer penetrating back into separate individual wraps of the outer duct wrapping layer. For instance, one of the prongs of the wrap retainer penetrates into wrap 47 while the other prong of this same wrap retainer penetrates into wrap 49.

The above wrapping method provides a number of positive benefits for the wrapping of the duct. Firstly, and as can be clearly seen from the drawings, the overall wrap is much less bulky than and flat in relation to the prior art wrapping method shown in FIG. 2 of the drawings. Furthermore, the provision of the double pronged pin ensures that the meeting edges of the adjacent external wraps are held in place by a single retainer and do not allow the individual wraps to lift off the duct. The external wraps are used to not only block any gaps between the internal wraps but are also used to hold the internal wraps against the outer surface of the duct.

As a final point, the feature that the duct post actually penetrates the wrap fixes the wrap on the duct and allows the duct to be used in a vertical position while precluding any possible slippage of the wrap along the duct.

FIG. 6 of the drawings shows another embodiment of the invention in which a duct 25 is provided with a plurality of duct wrap securing posts 31. According to this embodiment, the posts rather than being secured directly to the exterior surface of the duct are mounted on a collar 29 which fits over the surface of the duct. This collar is secured on the duct to establish a fixed position for the posts 31. These posts will once again penetrate the duct wrap material to receive a duct wrap retainer.

In the embodiments shown the collars 31 which are fitted individually onto the duct in their desired positions relative to one another could be positively secured to the duct as by spot-welding or the like. It is also possible to provide each of the collars with a. hinged construction which would open and close around the duct. Such a hinged construction can then be clamped in a fixed position on the duct. This would eliminate the requirement for any welding or the like.

It is to be noted that the wrapping technique showed in FIG. 4 could include more than only two layers of wrap. Although it is also possible to pin the wraps in a different manner it is preferred that the double pin be used to secure side by side wraps regardless of the number of wraps used.

Although various preferred embodiments of the present invention have been described in detail, it will be appreciated by those skilled in the art that variations may be made without departing from the spirit of the invention or the scope of the appended claims.

The embodiments of the invention in which an exclusive property or privilege is claimed are defined as follows:

1. A duct having an exterior surface covered by duct wrapping, said wrapping comprising a group of first wraps wrapped directly against the exterior surface of the duct, the first wraps having abutting edges with on another, said duct having outwardly projecting posts which penetrate through said first wraps at a location away from the abutting edges of the first wraps, a group of second wraps wrapped over said first wraps, said second wraps having abutting edges with one another, the abutting edges of the second wraps being located away from the abutting edges of the first wraps and the posts penetrating past the second wraps through the abutting edges of the second wraps; multiple pronged pins fitted to the posts, the prongs on each pin penetrating two of the second wraps where they are edge to edge with one another and the prongs on the pins being embedded through the second wraps into the first wraps to secure the second wraps as part of the duct wrapping.

* * * * *